United States Patent
Elliott et al.

(10) Patent No.: US 8,738,431 B2
(45) Date of Patent: May 27, 2014

(54) MOBILE ADVERTISING SYNDICATION

(75) Inventors: John W. Elliott, San Diego, CA (US);
James D. Coyer, Encinitas, CA (US);
Mark A. Maggenti, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 396 days.

(21) Appl. No.: 12/274,611

(22) Filed: Nov. 20, 2008

(65) Prior Publication Data
US 2010/0125491 A1    May 20, 2010

(51) Int. Cl.
*G06Q 30/00* (2012.01)
*G06Q 90/00* (2006.01)

(52) U.S. Cl.
CPC ..................................... *G06Q 90/00* (2013.01)
USPC ........................................................ 705/14.1

(58) Field of Classification Search
CPC ........................................................ G06Q 90/00
USPC ............................................................ 705/14.1
See application file for complete search history.

(56) References Cited

U.S. PATENT DOCUMENTS

| | | |
|---|---|---|
| 6,526,275 B1 | 2/2003 | Calvert |
| 2003/0003929 A1 | 1/2003 | Himmel et al. |
| 2005/0136949 A1 | 6/2005 | Barnes, Jr. |
| 2006/0217110 A1 | 9/2006 | Othmer |
| 2008/0033805 A1* | 2/2008 | Padin ............................. 705/14 |
| 2009/0259529 A1* | 10/2009 | Chiu et al. ...................... 705/14 |

FOREIGN PATENT DOCUMENTS

| | | |
|---|---|---|
| KR | 20050074459 A | 7/2005 |
| KR | 20070107588 A | 11/2007 |
| KR | 20080066676 A | 7/2008 |
| KR | 20080080448 A | 9/2008 |

\* cited by examiner

*Primary Examiner* — Daniel Lastra
(74) *Attorney, Agent, or Firm* — The Marbury Law Group, PLLC

(57) ABSTRACT

Apparatus and methods for distributing advertising content to a mobile device. An application is executed on a mobile device containing an advertising opportunity. Advertising content is requested from an advertisement syndication interface. A filtering constraint applicable to the advertising content request is identified and used to select and advertisement from a local advertising cache. The selected advertisement is rendered in a composite with rendering of content of the application.

92 Claims, 7 Drawing Sheets

| GetAd () | |
|---|---|
| Argument | Description |
| media_type 702 | {Graphic, rich media, video, text} – type of ad requested |
| size 704 | dimensional size of ad needed |
| location 706 | current geographic location of mobile device |
| demographic 708 | desired demographic profile characteristic of subscriber |
| time 710 | time |
| duration 712 | Ad duration |
| rendering_caps 714 | device rendering capabilities/preference (e.g., frame rate, color, depth) |
| urgency 716 | in how many seconds does the application need the ad |
| callback 718 | Function to call when the ad is ready |

*FIG. 7*

| WriteLogEvent () | |
|---|---|
| Argument | Description |
| App_id 802 | Application Identifier of the calling application |
| Name/value_pair_x 804 | A secure field understood by the logging application for user privacy |

*FIG. 8*

MOBILE ADVERTISING SYNDICATION

BACKGROUND

Consumers worldwide have evinced a desire for continuous ubiquitous access to information, communication links, and entertainment content. This desire has led to the introduction of mobile devices (e.g., cell phones, personal media devices (PMDs), portable gaming systems, etc. . . . ) with increased communication throughput and processing capabilities capable of handling complex data rich interactions with between users and providers. As more people use their mobile devices for data rich applications such as web surfing and viewing mobile television, the providers of such services naturally seek methods to derive profit from these activities.

One obvious method is to charge for the various services. However, users of such services will only pay a limited amount, which may or may not adequately compensate the providers of the services. Compounding the problem, a variety of parties are typically involved in the providing of such services. For example, there is the provider of the communication path (e.g. the cellular network operator), the content aggregators (e.g. the networks and web site operators), and the content providers. As a result, providers are looking to advertising to generate a revenue stream.

This is not unexpected as traditional main stream media outlets such as newspaper, television and radio have long relied upon advertisements to generate revenue streams. Advertising on mobile devices is estimated by one analyst to become a worldwide $25B market by 2011 as mobile devices proliferate around the world. However, much like the Internet, advertising on mobile devices present challenges when compared to traditional broadcast media. For example, when "pushing" advertisements, especially large format "rich" advertisements, consideration must be given to the limited throughput associated with wireless networks and the limited power available to mobile devices.

SUMMARY

The following presents a simplified summary to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In accordance with one or more aspects and corresponding disclosure thereof, various aspects are described in connection with an advertising syndication method and apparatus that leverages the reach of a multicast network, thereby providing cost efficiencies in delivery of advertising content. In some aspects, the value of scheduling, delivering, targeting and measuring advertising presentations (impressions) is aggregated in a common service, making advertising deployment more convenient for mobile device vendors, mobile application developers and providers, advertising content providers, and wireless communication operators or carriers.

In one aspect, a method utilizes syndicated advertising content on a mobile device. An application on a mobile device containing an advertising opportunity. An advertisement syndication interface is called upon to request advertising content. A filtering constraint applicable to the advertising content request is determined. An advertisement is selected in accordance with the filtering constraint from a local advertising cache. The selected advertisement is rendered composited with rendering of content of the application.

In another aspect, at least one processor utilizing syndicated advertising content on a mobile device. A first module executes an application on a mobile device containing an advertising opportunity. A second module calls upon an advertisement syndication interface to request advertising content. A third module determines a filtering constraint applicable to the advertising content request. A fourth module selects an advertisement in accordance with the filtering constraint from a local advertising cache. A fifth module renders the selected advertisement composited with rendering of content of the application.

In an additional aspect, a computer program product for utilizing syndicated advertising content on a mobile device by having a computer-readable storage medium that provides codes. A first set of instructions causes a computer to execute an application on a mobile device containing an advertising opportunity. A second set of instructions causes the computer to call upon an advertisement syndication interface to request advertising content. A third set of instructions causes the computer to determine a filtering constraint applicable to the advertising content request. A fourth set of instructions causes the computer to select an advertisement in accordance with the filtering constraint from a local advertising cache. A fifth set of instructions causes the computer to render the selected advertisement composited with rendering of content of the application.

In another additional aspect, an apparatus utilizes syndicated advertising content on a mobile device. Means are provided for executing an application on a mobile device containing an advertising opportunity. Means are provided for calling upon an advertisement syndication interface to request advertising content. Means are provided for determining a filtering constraint applicable to the advertising content request. Means are provided for selecting an advertisement in accordance with the filtering constraint from a local advertising cache. Means are provided for rendering the selected advertisement composited with rendering of content of the application.

In a further aspect, an apparatus utilizes syndicated advertising content on a mobile device. An application executes on a mobile computing platform of a mobile device and requests request advertising content for an advertising opportunity. A client advertising interface executed on the mobile computing platform responds to the request for advertising content by determining a filtering constraint applicable to the advertising content request and selecting an advertisement in accordance with the filtering constraint from a local cache. A user interface rendering the selected advertisement composited with rendering of content of the application.

In one aspect, a method wirelessly syndicates advertising content to a mobile device. Advertising content is tagged with a filtering constraint. The advertising content tagged with the filtering constraint is wirelessly multicast to a client advertising interface executed respectively on a plurality of mobile devices for being locally cached and selectively played in conformance to the tagged filtering constraint in conjunction with an advertising opportunity defined in a mobile application. A usage report is received from the plurality of mobile devices pertaining to advertising usage with the mobile application.

In yet another aspect, at least one processor wirelessly syndicates advertising content to mobile device. A first module tags advertising content with a filtering constraint. A second module wirelessly multicasts the advertising content tagged with the filtering constraint to a client advertising interface executed respectively on a plurality of mobile devices for being locally cached and selectively played in conformance to the tagged filtering constraint in conjunction with an advertising opportunity defined in a mobile application. A third module receives a usage report from the plurality of mobile devices pertaining to advertising usage with the mobile application.

In yet an additional aspect, a computer program product wirelessly syndicates advertising content to mobile device has a computer-readable storage medium containing codes. A first set of instructions causes a computer to tag advertising content with a filtering constraint. A second set of instructions causes the computer to wirelessly multicast the advertising content tagged with the filtering constraint to a client advertising interface executed respectively on a plurality of mobile devices for being locally cached and selectively played in conformance to the tagged filtering constraint in conjunction with an advertising opportunity defined in a mobile application. A third set of instructions causes the computer to receive a usage report from the plurality of mobile devices pertaining to advertising usage with the mobile application.

In yet another additional aspect, an apparatus wirelessly syndicates advertising content to mobile device. Means are provided for tagging advertising content with a filtering constraint. Means are provided for wirelessly multicasting the advertising content tagged with the filtering constraint to a client advertising interface executed respectively on a plurality of mobile devices for being locally cached and selectively played in conformance to the tagged filtering constraint in conjunction with an advertising opportunity defined in a mobile application. Means are provided for receiving a usage report from the plurality of mobile devices pertaining to advertising usage with the mobile application.

In yet a further aspect, an apparatus wirelessly syndicates advertising content to mobile device. An advertising service component tags advertising content with a filtering constraint. A multicast broadcast transmitter wirelessly multicasts the advertising content tagged with the filtering constraint to a client advertising interface executed respectively on a plurality of mobile devices for being locally cached and selectively played in conformance to the tagged filtering constraint in conjunction with an advertising opportunity defined in a mobile application. A network receiver receives a usage report from the plurality of mobile devices pertaining to usage with the mobile application.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein:

FIG. 7 is a diagram of a get advertising data structure; and

FIG. 8 is a diagram of a write log event data structure.

DETAILED DESCRIPTION

In a personalized, measurable way, large format rich advertising content is delivered over a wireless network to a population of mobile devices. Limited data throughput is accommodated by utilizing a multicasting broadcast radio network, avoiding the increased communications necessary to unicast to individual mobile devices. Power constraints of the mobile devices are respected by allowing the devices to deliver files over broadcast ("clip cast") advertising content when needed, and in particular to select content that satisfies certain filtering constraints, such as imposed by the subscriber, the advertiser, or a mobile application that executes on the mobile device that provides an advertising opportunity. In particular, a client ad syndication interface monitors application and advertising usage, facilitates the download and selection for rendering of advertising content, and reports the usage to a remote network for billing purposes and ad campaign effectiveness metrics. This interface can make advertisements and applications less computing platform and application dependent as well as facilitating ad targeting and an enhanced user experience. The client ad syndication interface syndicates advertisements, that is the advertisements are made available for any application or component on a mobile device. This is to be contrasted with each application managing and delivering its own ad inventory, rendering the appropriate targeted ad, and logging and transmitting usage information back to a database.

In an illustrative aspect, advertising syndication pertains to a system that takes a store of advertisements that are offered selectively to one or more devices, and more particularly offered selectively to programs and advertising slots executed on the devices. In an exemplary aspect, extending a paradigm of syndication long known in print media (e.g., newspapers, periodicals, etc.), mobile advertising syndication can provide an association that offers materials to one or more segments of a mobile device population.

It should be appreciated that delivery of large format rich advertising content is an illustrative use and that aspects disclosed herein can be advantageously used in delivering smaller scale content and non-advertising content.

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are shown in block diagram form to facilitate describing these aspects.

Figure 1:
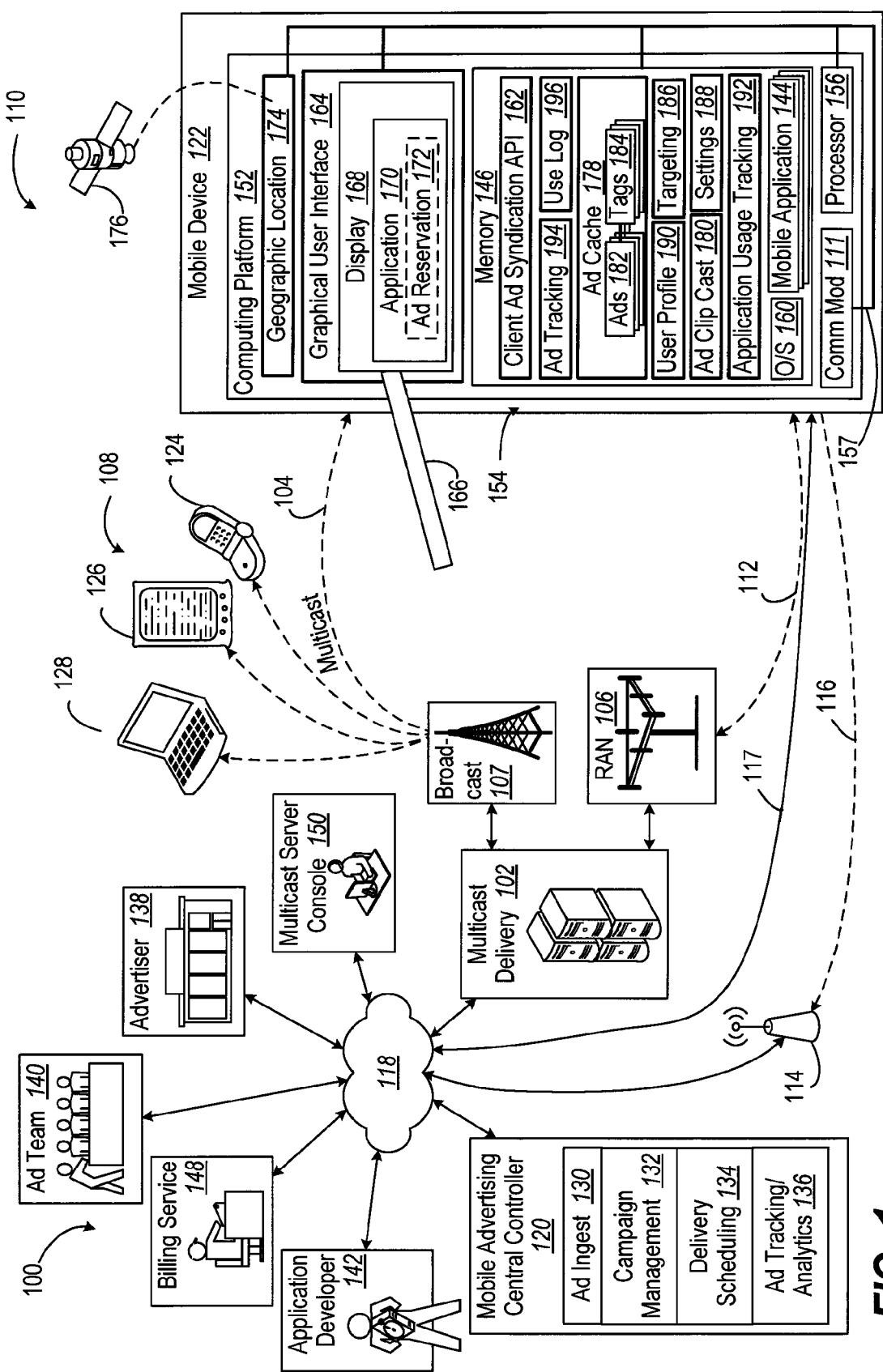
FIG. 1 is a block diagram of a mobile advertising syndication framework.

Turning to the Drawings, in FIG. 1, a mobile advertising syndication framework 100 leverages the efficiencies of a multicast broadcast network 102 in delivery of large format "rich" advertising content over a multicast over-the-air (OTA) "downlink" channel 104 from a radio access node (RAN) 106 or a unidirectional broadcaster 107 to a population of mobile devices 108 of a communication system 110. The mobile devices 108 in one aspect can have a communication module 111 that responds individually via circuit switched (CS) or packet switched (PS) "uplink" channel 112 to the RAN 106 (e.g., 2G/3G/4G cellular telephone). Alternatively or in addition, the mobile devices 108 can have a communication module 111 that responds via wireless access point (AP) 114 over an 802.11 uplink channel 116. Alternatively or in addition, the mobile devices 108 can have a persistent or intermittent wired network access as depicted at 117. In another aspect, a communication module 111 can be a dual mode device capable of both types of uplink communication. These responses can provide data as to the effectiveness of an advertising campaign over a network 118 to a mobile advertising central controller 120. For example, portions of the network 118 can comprise a public or private Internet, public telephone switched network (PSTN).

For convenience and clarity, unicast as used herein refers to sending information packets to a single destination. While such transmissions may be picked up by multiple receivers, only the addressed receiver digests the data. Physically, messages are directed only over those links in a network required to achieve delivery, thereby limiting the number of devices on the network that actually receive the messages to a minimum. Unicast allows a single user to personalize receiving data on the fly. Web browsing to a particular streamed media clip is an example of unicasting.

Multicast as used herein refers to transmitting information packets addressed to a range of receivers. Multicast is typically implemented on an otherwise unicast-based network using network addressing methods for the delivery of information to a group of destinations simultaneously. Multicast methods strive for efficiency through delivering the messages over each link of the network only once, creating copies only when the links to the multiple destinations split, typically at network switches and routers. Multicast is often used for streaming media and Internet television applications where the media is streamed to all requesting users in the same time frame. An example is a group selecting to receive streaming video of a live performance or sports contest.

Broadcast as used herein refers to transmitting information, which in some but not all instances can be packetized, to all units capable of receiving the transmission without distinction. Over-the-air television and radio are particular examples of broadcast networks. For example, everybody tuned to channel 8 receives the same signal at the same time with the transmission time chosen by the broadcaster rather than the user. Broadcast networks are usually physically separate from unicast based networks as, generally, one-to-many transmissions of data are not efficient on a unicast based network. Broadcast networks are also generally thought of as being one-way communication paths.

To provide more of a user-directed unicast or multicast content receiving experience without the corresponding network resource scalability constraints, services such as the MediaFLO™ system provided by QUALCOMM CORPORATION®, San Diego, Calif., provide a one-to-many content or media broadcast capability. It is to be noted that most digital video broadcasting networks, like MediaFLO and DVH-H, use digital rights management systems to prevent the decoding of the received data absent subscriptions. In some ways this mimics functionality of multicast systems in that only those users electing (e.g. paying) to receive the content can view the content. In some aspects, these services are focused on delivering live performance broadcasts of general appeal that users manually select to view.

Thus, illustrative examples of multicast broadcast networks 102 include MediaFLO™ media distribution system, available from QUALCOMM Incorporated of San Diego, Calif., Digital Video Broadcast-Handheld (DVB-H) and Broadcast and Multicast Services (BCMCS). In one aspect, the broadcast network 102 can further perform unicast communications such as WiMax, cellular telephone, etc. Network 102 may be any private or public wireless communications network operating according to any known standard, including Code Division Multiple Access (CDMA), cdmaOne, cdma2000, Universal Mobile Telecommunication System (UMTS), Wideband CDMA, Global System for Mobile Communications (GSM), and TIA/EIA-136.

The population of mobile devices 108 is depicted as various types of user equipment or access terminals (e.g., converged handheld computer 122, smart phone 124, portable media player (not shown), wireless-capable handheld game console (not shown), personal digital assistant 126, and a laptop 128, etc.).

The mobile advertising central controller 120 coordinates advertisement (ad) definition, ingestion, delivery, serving and reporting to achieve end-to-end ad syndication, depicted as being performed by an ad ingest module 130, campaign management module 132, delivery scheduling module 134, and an ad tracking/analytics module 136. Advertising content originates as creative files and advertising objectives of an advertiser 138, which can be an ad agency. An ad team 140 knowledgeable about the population of mobile devices 108 can convert the creative files and advertising objectives into advertising content suitable for distribution. To advance the penetration and effectiveness of ad syndication, application developers or providers 142 can become involved in creating advertising opportunities in their deployed applications, depicted as an application 144 stored in memory 146 of the mobile device 122. Defining such opportunities can be in return for usage data on the performance of their application 144 or for remuneration for participation in the ad syndication, depicted as being credited by a billing service 148. The ad team 140 provides the ad content to a multicast service console 150 that can schedule the ad content on the multicast broadcast network 102 for distribution.

The mobile device 122 advantageously has a computing platform 152 manages constraints on power and storage as well as intermittent download communication. In particular, a client ad syndication system 154 executes on the computing platform 152 to implement mobile ad syndication autonomously, with intermittent communications, and in a targeted fashion. The computer platform 152 comprises a processor 156 and the memory 146 communicating over a data bus 157. Processor 156 controls the operation of the mobile device 122 according to an operating system (O/S) 160, applications or programs or modules stored in memory 146. The control functions may be implemented, for example, in a single microprocessor, or in multiple microprocessors. Suitable microprocessors may include general purpose and special purpose microprocessors, state machines, as well as digital signal processors. Further, for example, processor 156 may be an application-specific integrated circuit (ASIC), or other chipset, logic circuit, or other data processing device. Processor 156 or other data processing device such as ASIC can execute an application programming interface (API) layer that interfaces with any resident applications, and/or programs and/or modules, such as client ad syndication API 162, stored in memory 146.

Memory 146 represents all of the memory associated with mobile device 122, and may include both random access memory (RAM) and read-only memory (ROM), erasable ROM (EPROM), electronically erasable ROM (EEPROM), flash cards, or any memory common to computer platforms. Further, memory 146 may include one or more flash memory cells, or may be any secondary or tertiary storage device, such as magnetic media, optical media, tape, or soft or hard disk. For example, computer program instructions and data utilized in the operation of mobile device 122 may be stored in nonvolatile memory, such as EPROM, EEPROM, and/or flash memory. Additionally, memory 146 may be implemented as discrete devices, stacked devices, or may be integrated with processor 156. Memory 146 can also include areas partitioned into and designated for use as temporary memory buffers, or for use by the client ad syndication system 154

In the exemplary aspect, an integral graphical user interface (GUI) 164 with input device, depicted as touch screen stylus 166, and an output device, depicted as display 168, allows the user to interact with application rendering 170 that presents an opportunity for an integral advertisement presentation (reservation) 172. For example, an input device 166 can comprise a mechanism such as a key, keypad and/or keyboard, a mouse, a touch-screen display, a microphone, etc. In certain aspects, an output device 168 may include or comprise an audio speaker, display, a haptic feedback mechanism, etc.

The mobile device 122 can advantageously sense or receive geographic location information from a location module 174, depicted as being responsive to global positioning system (GPS) satellites 176. It should be noted, however, that location module 174 may alternately, or in addition, be responsive to a terrestrial-based wireless communication network, e.g. a CDMA network, where all or some portion of the position determination may be based on communications with base stations, and/or where location determination calculations are performed in whole or in part by network servers. Alternatively or in addition, the location module 174 can comprise an inertial platform that detects changes in location.

The client ad syndication system 154 can advantageously comprise a number of features, components, modules or options such as managing an ad cache 178. An ad clip cast module 180 can selectively store advertising content (ad) 182 received over the multicast downlink channel 104 to the ad cache 178. These ads 182 can be received with a tag 184 that categorizes the ad, provides technical characteristics useful in successfully rendering the ad 182, provides subscriber profile (target) data, or provides campaign metrics such as duration, frequency, and dates to constrain use (impressions). In one aspect, the multicast contains sufficient instructions for the mobile device 122 to determine what ads 182 should be stored and when to be played.

Alternatively or in addition, the client ad syndication system 154 is capable of making such determinations. For example, a targeting module 186 can apply a filtering constraint for those ads that should be stored and used by referencing a filtering constraint provided by user settings 188. Such settings could be made into the GUI 164 or made via an external interface such as a web portal (not shown) and communicated to the mobile device 122. Such settings could include a preference for certain kinds of advertisements (e.g., sportswear, Brand X, movie releases, etc.). Such settings could include a preference for advertisements that provide a credit to the subscriber or to a charity for agreeing to receive and present the advertisement. Such settings could include a block to certain categories of advertisements, such as blocking objectionable material (e.g., alcohol products, tobacco products, sexually suggestive products, etc.).

Alternatively or in addition, the targeting module 186 can determine filtering constraints at least in part by inferring subscriber preferences and attitudes, such as by accessing a user profile 190 that contains information such as age, sex, residence, ethnicity, socioeconomic classification, education level, etc.

The client ad syndication system 154 can advantageously monitor execution of applications 144, such as by an application usage tracking module 192. In addition to tracking usage, such monitoring can further be provided sufficient status tracking via the client ad syndication interface 162 to determine particular portions of the application 144 being used. Thereby, ad tracking module 194 can monitor advertising impressions for storing in use log 196 but also correlate impressions with particular applications 144 to provide an incentive to application providers 142.

Figure 2:
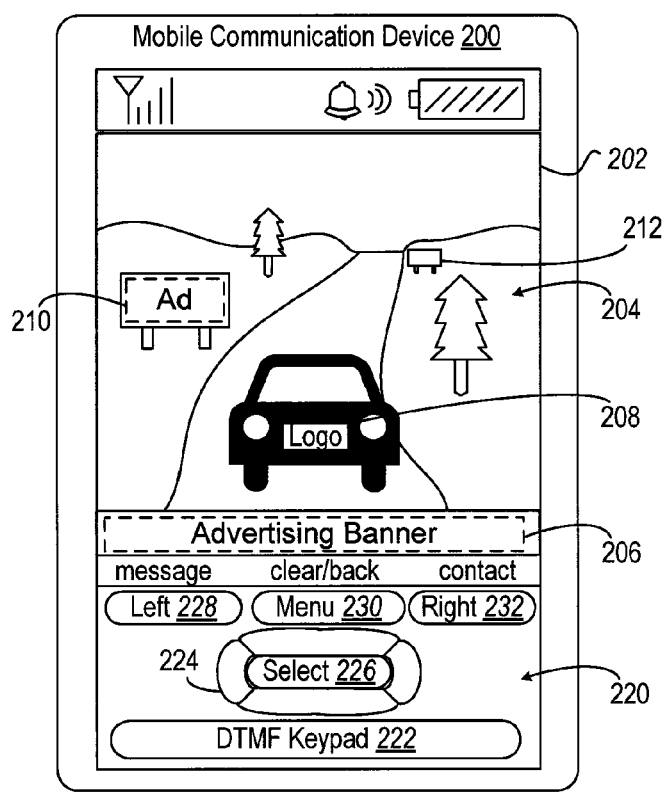
FIG. 2 is a diagram of a mobile device.

In FIG. 2, an exemplary mobile communication device 200 is depicted as having a graphical user interface (GUI) 202 that is rendering a game application 204 that has several advertising opportunities that can be dynamically supported by the client ad syndication API 162 (FIG. 1). For example, the application 204 can reserve a bordering advertising banner space 206. As another example, the application 204 can provide branding opportunities, such as requesting a car logo 208, or changing to a graphical representation of product type based on available advertising revenue for that type of product. As a further example, transient and integral advertising opportunities can be provided that enhance the user experience and realism, as well as making the advertising more eye catching. For instance, a current visible ad sign 210 is depicted for previously requested ad content. The application 204 can be requesting another ad for an upcoming ad sign 212 that will become visible within a short period (e.g., 5 seconds).

The mobile communication device 200 further illustrates user interacting with the application 204 and perhaps the advertisements as well via mobile phone user interface 220, including dial tone multiple frequency (DTMF) keypad 222, cursor buttons 224 and select button 226, and left, center, and right programmable menu buttons 228, 230, 232.

Figure 3:
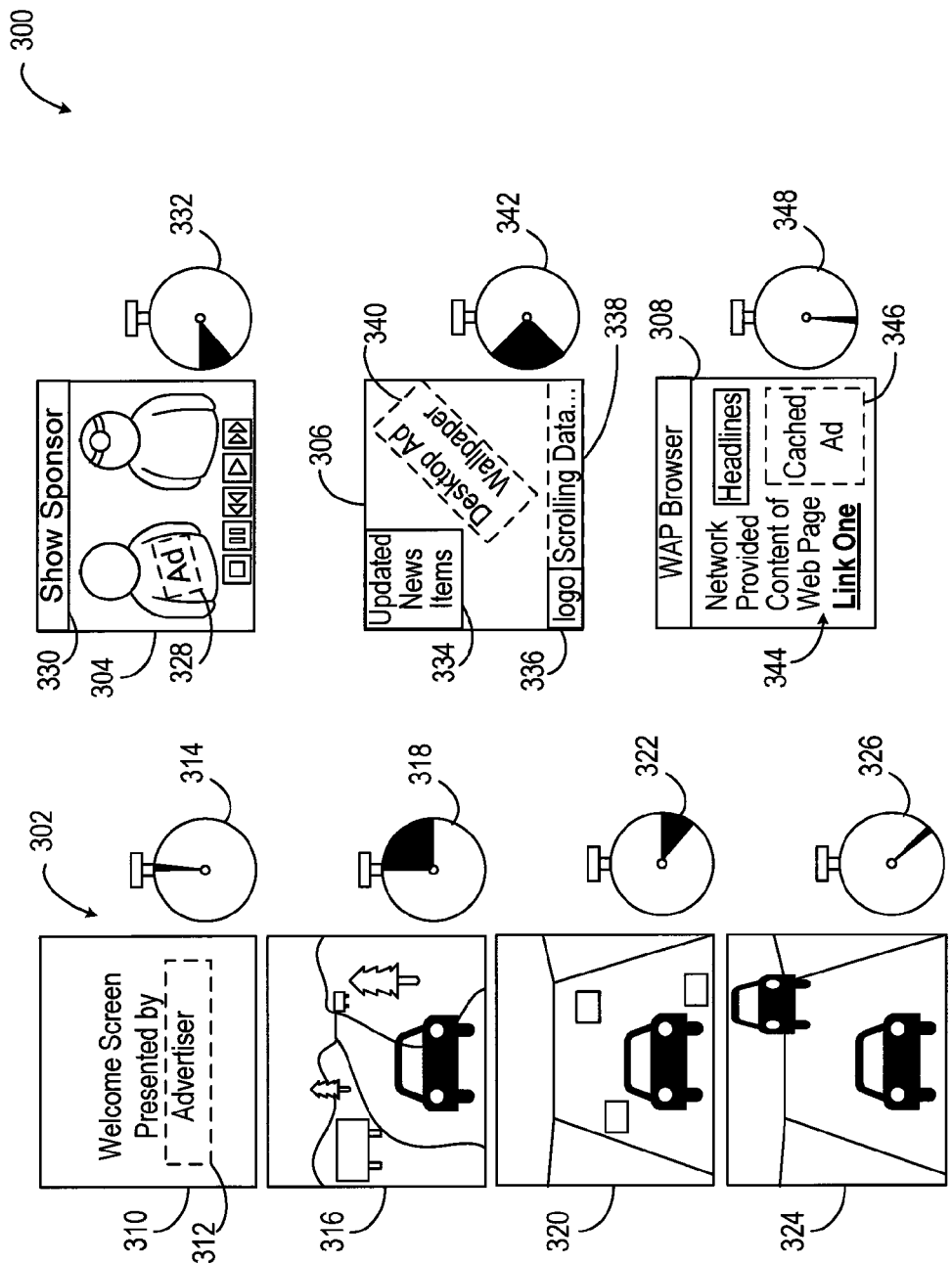
FIG. 3 a sequence of diagrams illustrating a graphical user interface for a mobile device.

In FIG. 3, a sequence of screen shots 300 depicts illustrative interactions between the client ad syndication system 154 (FIG. 1) and mobile applications, depicted as a game application 302, an audio video player 304 (e.g., television show, digital movie, music video, etc.), a mobile desktop screen 306, and a wireless application protocol (WAP) browser 308, each providing various kinds of advertising opportunities. Usage of each application can be tracked relative to total use time, particular times of day, or particular portions of the application that are viewed or interacted with.

For instance, the game application 302 can begin with a welcome screen 310 having an advertiser opportunity 312 and that is monitored as being viewed only briefly as depicted at 314. The game application 302 proceeds to a later section as depicted at 316 as discussed above in FIG. 2 that has a large duration of exposure as depicted at 318. The game application 302 can then proceed to another section as depicted at 320 having a reduced but significant period of usage as depicted at 322. Finally, the game application 302 has another segment depicted at 324 of very short duration (e.g., game difficulty prevents reaching frequently) 326. Thus, the usage data can provide useful information to the advertiser as well as the application provider.

The audio video player 304 is depicted as having different kinds of advertising opportunities, such as being able to insert product promotion ads 328 and a sponsor banner 330. Usage of this application can be monitored as depicted at 332.

The mobile desktop screen 306 that draws user viewing with updated news items 334 can provide yet other types of advertising options, such as adding a logo 336 to a scrolling data window 338 and desktop ad wallpaper 340. Again the usage can be monitored as depicted at 342.

The WAP browser 308 can provide network provided content 344, such as headlines and links and supporting text. Burdens on the network are mitigated by utilizing cached ads 346 that can be targeted based on locally cached advertising content. The usage of this application can be monitored as depicted at 348.

Figure 4:
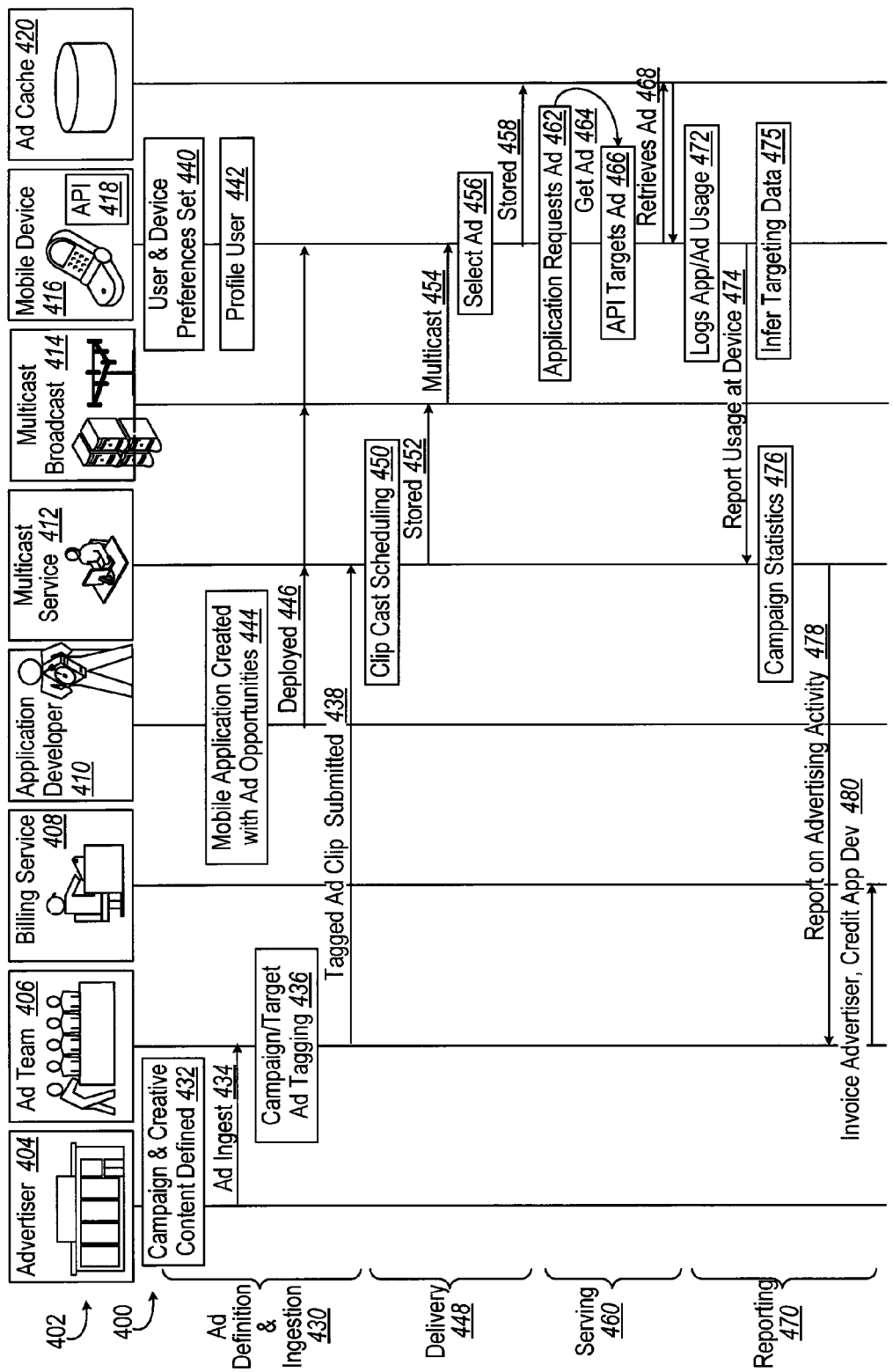
FIG. 4 is a timing diagram of mobile advertising syndication.
Figure 5:
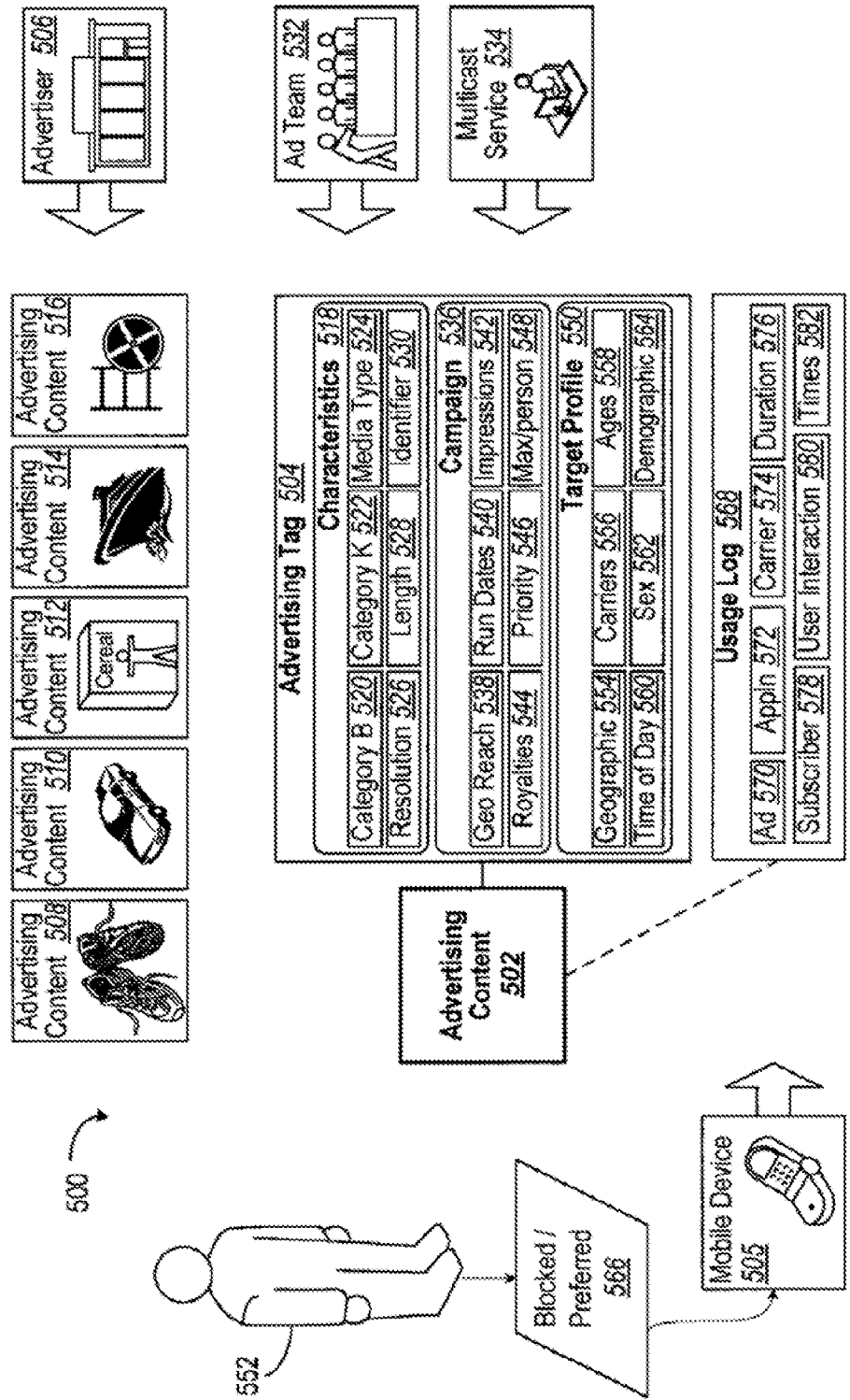
FIG. 5 is a block diagram of advertising content.
Figure 6:
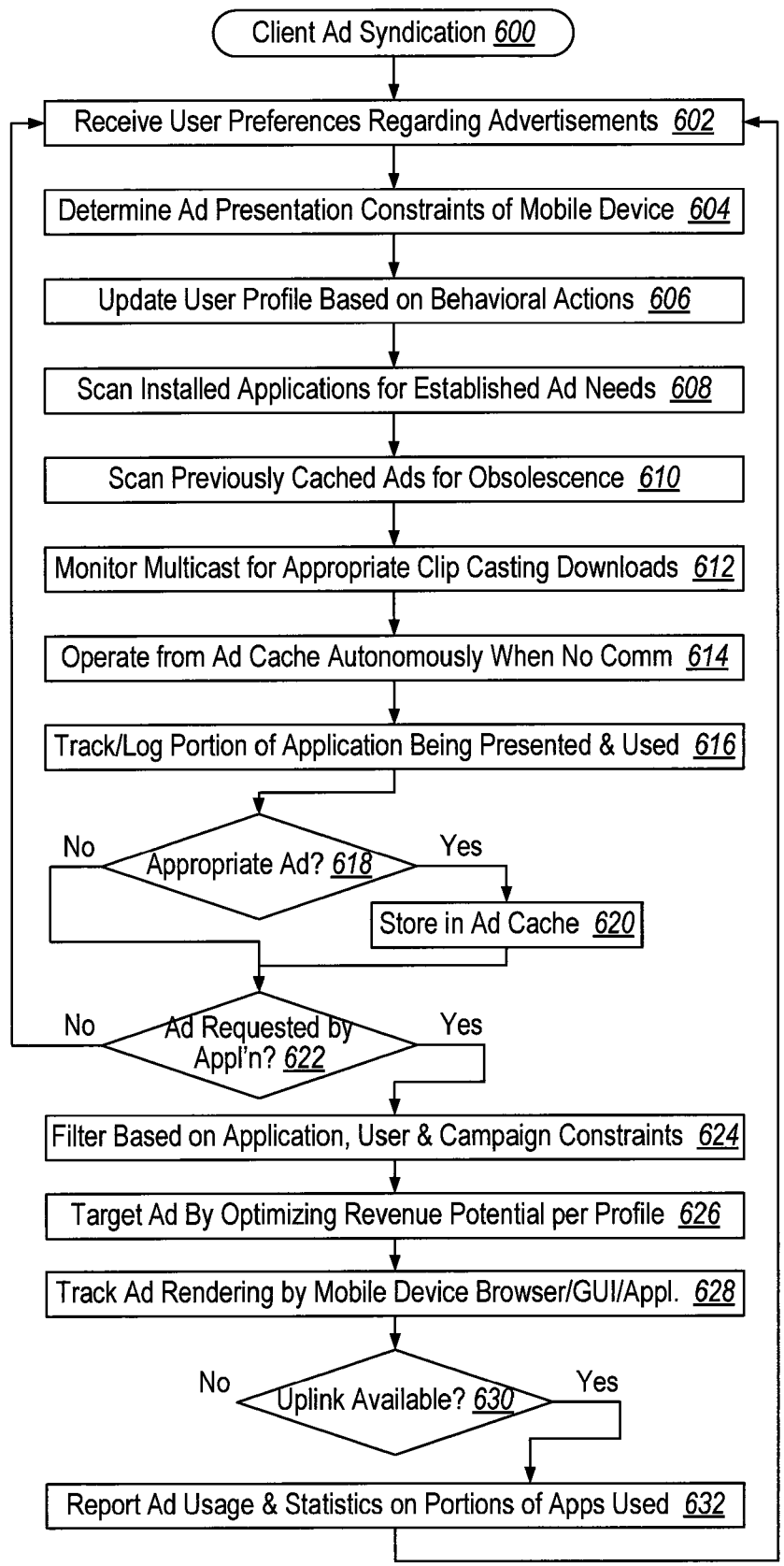
FIG. 6 is a flow chart of a method of client advertising syndication.

FIGS. 4-6 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference to FIG. 4, a methodology 400 is depicted for mobile advertising syndication that leverages the efficiencies of multicasting over a communication network 402 with participation by an advertiser 404, an ad team 406, billing service 408, application developer 410, multicast service console 412, multicast broadcast system 414, mobile device 416 having a client ad syndication API 418, and an ad cache 420.

The methodology 400 is depicted as beginning with an ad ingestion and definition portion 430 for preparing ad content for multicasting. As depicted at 432, the advertiser 404 creates creative content (e.g., audio, video, images, etc.) as well as defining campaign business objectives, perhaps in contractual terms. This ad content and campaign objectives are transmitted to the ad team 406 for ad ingestion as depicted at 434. The ad team 406 responds by packaging the ad content into a format suitable for mobile applications and mobile devices, as well as integrating the campaign and targeted subscriber profile attributes by tagging or similar associations (block 436). Prioritization and coverage can be made with reference to subscriber database information to estimate an approach reach for the ad content. The advertising clip with associated characteristics/campaign/profile tag is submitted to the multicast service console (block 438).

The illustrative cooperation among various entities is simplified for clarity. It should be appreciated with the benefit of the present disclosure that the illustrative ad team 406 can comprise human interactions, automated reformatting and integration, or a combination thereof. In addition, the depicted functions can be performed by fewer entities or distributed among more entities.

At some point prior, the mobile device 416 is prepared for ad syndication. For example, the user and device preferences and settings can be established or selected as depicted at block 440, which can be determined by the mobile device 416 or sent to the mobile device 416. The profile for the user can also be established as depicted at block 442, such as through demographic categorization or detected parameters (e.g., current or residential location). The demographic information can be explicitly input by a user, retrieved from a remote source, inferred from objective data, or calculated/estimated based upon available data. In addition, the application developer 410 has created mobile applications that have inherent opportunities for advertising (block 444) that have been deployed to the mobile device 416 as depicted at 446. Deployment can be installation at the original equipment manufacturer (OEM), local download from storage media such as a CDROM, activated by installing a digital key, or wirelessly transmitted.

The methodology 400 continues with a delivery portion 448. The multicast service console 412 schedules multicast clip casting (block 450) and stores the tagged ad clips in the multicast broadcast system 414 (block 452). At a convenient time taking advantage of unused broadcast allocation, the multicast broadcast system 414 wirelessly multicasts the tagged ad clips to the population of mobile devices 416 (block 454). The client ad syndication API 418 can selectively receive ads (block 456). To save power, the API 418 ignore clip casting when sufficient current ads are in local cache or when current offerings are not appropriate for the mobile device 416 based on one or more filtering constraints. Those received can then be stored as depicted at 458 in the ad cache 420.

With the mobile device 414 readied, the methodology 400 continues with an advertisement serving portion 460 when the mobile application requests an ad (block 462). The mobile application can make this request from the API 418 via a get ad request depicted at 464. The API targets an appropriate ad in block 466 based on one or more filtering constraints and retrieves the selected ad from ad cache 420 for use as depicted in block 468.

The methodology 400 advantageously concludes by reporting usage, particularly advertising usage, in a reporting portion 470. The API 418 logs application usage and advertisement impressions (block 472). When an appropriate uplink communication channel is available or at a convenient or allocated time, the mobile device 416 reports the device usage to the multicast service 412 or another radio access technology (block 474). In addition, the usage information can be fed back to the client-side targeting system to infer demographic information as well as define a behavioral profile for additional targeting (block 475). The multicast service console 412 or another responsible entity can derive campaign statistics (block 476). Reporting of advertising activity, which can be de-personalized for subscriber privacy, is transmitted to other entities, illustrated at 478 that can prompt credits to participants in the delivery and invoicing to the advertiser for confirmed satisfaction of campaign objectives (block 480).

With reference to FIG. 5, an advertisement tagging methodology 500 advantageously associates advertising content 502 with attributes, such as an electronic advertising tags 504, that specifies or enables selective filtering by the mobile device 505 (FIG. 1). In particular, advertising content originates with inherent and differing attributes as created by an advertiser 506. These varying attributes are depicted as a sportswear ad 508, a car ad 510, a food ad 512, a travel ad 514, and a multimedia service 516. A standardized characteristics tag portion 518 of the advertising tag 504 can provide metadata for filtering, such as a plurality of categorizations depicted as Category B (e.g., "sports") 520, Category K (e.g., "clothes") 522, media type (e.g., TIF or JPEG image, MP4 video, MP3 audio clip, etc.) 524, image resolution (e.g., 250× 150 pixels, 16-bit color) 526, length (e.g., 3 second repeating animation, 30-second duration, etc.) 528, and identifier 530 for tracking and reporting usage of the advertising content 502. It should be appreciated that conforming the advertising tag 504 to certain protocols for multicasting or mobile device consumption can include participation by an ad team 532 or a multicast service console 534 as well as the advertiser 506. Certain standardizations can be agreed upon that can obviate having to characterize the advertising content 502 and these aspects are merely illustrative.

Alternatively or in addition, the advertising tagging methodology 500 can further include a campaign tag portion 536 to expresses measurable goals that can be implemented, tracked and reported to satisfy an advertising campaign. Such metrics are illustrated by a geographic reach field 538 (e.g., U.S.-wide, North America, Northeastern U.S. states, Kansas City, multicast broadcasters proximate to advertiser locations, etc.). The campaign can specify run dates (e.g., start and end dates) field 540. A total impression field 542 can give an indication of how often and how wide spread the multicasting should be to achieve a desired number of presentations (impressions) of the ad 502. The campaign tag portion 536 can include a royalty field 544 that enables royalty optimization by the multicaster 534 or the mobile device 505. For example, the royalty information can provide detailed insights such as royalties for presentation in a particular kind of application or to a certain category of subscriber. Thus, optimizations can enable selections of ads 502 to maximize royalties. Another campaign tag portion 536 is illustrated as being a priority field 546 that directs the multicaster service 534 or the mobile device 505 as to what order to multicast or store and present, respectively. Maximum impressions per person field 548 can indicate to the mobile device 505 how many times to show the advertisement or a maximum number of times to show the advertisement.

Alternatively or in addition, the advertising tagging methodology 500 can include a target subscriber tag portion 550 that indicates to the multicast service 534 what subsets of mobile devices should be multicasted or indicates to the mobile device 505 what ads 502 should be stored and presented to a subscribing user 552. For instance, a geographic field 554 specifies certain locations that should receive the ad 502, which can be a residential, work or current location of the subscribing user 552. A carrier (operator) field 556 can target the ad to certain mobile devices 505 that subscribe to a particular premium service or to a certain communication carrier. An age field 558 specifies one or more age ranges. A time of day field 560 can specify a time of day, day of the week, etc. in which the ad should be presented. For example, a restaurant may want their ad to run during their hours of operation. A sex field 562 can specify male or female. A demographic field 564 can specify other categories, such as socioeconomic group, education-level, political party, religion, association membership, veteran status, etc. Fields can also specify desired behavioral criteria, such as daily viewing time, daily text message volume, daily news article reading volume, frequency/volume of stock price check, etc.

The subscribing user 552 can input blocked ads/preferred ads 566 that keys in on the characteristics tag portion 518, such as I do not want to see alcohol or tobacco ads or I do want to see such ads. The subscribing user 552 can input certain personal information or enable access and reporting of certain demographic data to satisfy the target tag portion 550. The mobile device 505 can also create usage logs 568 associated with the advertising content 502 to provide closed-loop control of multicast ad syndication. For instance, an ad field 570 can identify which ad was presented. An application field 572 can specify how the ad was presented. A carrier field 574 can identify certain links in the ad syndication for enabling crediting of participation in the ad syndication. A duration field 576 can communicate how long the subscribing user 552 was exposed to the ad 502. This duration can be predicated on certain user inputs to the mobile device 505 that gives a high confidence of being actively viewing/hearing/feeling the output of the advertisement content 502. A subscriber field 578 can identify the subscriber user 552. At some point in the reporting chain, the identification can be de-personalized to protect user privacy. A user interaction field 580 can indicate whether the subscribing user 552 responded to the ad, such as selecting an icon associated with the ad content 502, called a telephone number displayed in the ad, etc. A times field 582 can detail durations of each impression or detail the time of day and date of the impressions. The usage log 568 can also indicate a location of where viewed and other information (not shown).

In FIG. 6, a methodology for client ad syndication 600 can leverage the insights into the advertising content provided by the tagging as well as flexibly responding to multicast communication. In block 602, user preferences regarding advertisements are received. In block 604, filtering constraints for ad storing and presentation are determined by the mobile device by refereeing characteristics, campaign or targeting tags associated with received advertising content. In block 606, a user profile associated with the mobile device can be updated based on behavioral actions, demographic inputs, or user preferences. In block 608, an ad syndication client API can scan installed mobile applications to ascertain needs that the mobile device can have for syndicated ads and thus download appropriate content in preparation. For example, certain types of ads can be appropriate for a WAP browser and others can be appropriate for game applications. In block 610, maintenance of ad cache is performed, such as identifying downloaded ads that have expired or have met their campaign objectives. In block 612, multicast communications can be monitored to identify an appropriate ad for reception and storage, such as waking up to retrieve more ads when ad cache has room available. Use of priority data or royalty data or user preference data, etc., can provide guidance for replacing unexpired ads in ad cache with ads with a higher value to the advertiser, ad syndicator, or subscribing user. In block 614, the client ad syndication API can provide ad services even when downlink or uplink communication is unavailable. In block 616, the API can advantageously monitor mobile application usage for characterizing the user and for network ad syndicators to identify ad opportunities that could be utilized in the future. Ads presented are logged in conjunction with the circumstances of the impression.

In block 618, a determination is made as to whether a received ad is appropriate for the subscriber. If so, the ad is stored in ad cache in block 620. In block 622, when an ad is requested by a mobile application, then in block 624 the API filters cached ad possibilities based on some combination of the application ad requirements, user preferences, campaign constraints, and profile constraints. In block 626, in some aspects insights into royalty potential for certain cached ads can be optimized. In block 628, the selected advertisement is rendered for presentation on the mobile device GUI. In block 630, a determination is made as to whether an uplink is available to a network entity that collects metrics on accomplishment of ad syndication. If so, a report on ad usage and advantageously statistical information on portions of mobile applications used are relayed in block 632.

In FIG. 7, an illustrative GetAd API key function 700 can be used for a mobile application to communicate its suggestions for ad content. In an exemplary depiction, a media type argument 702 can specify the type of ad requested, such as graphic, rich media, video, text, etc. A size argument 704 can specify a dimensional size of the requested ad. A location argument 706 can report a current geographic location of the mobile device, for example, if the ad should correspond to current location or if the API needs to know what the current location is. A demographic argument 708 specifies one or more desired demographic profile aspects of the subscriber to view the ad. A time argument 710 specifies a current time, if unavailable to the API, for satisfying time of day selection and logging. A duration argument 712 can specify a duration for the ad (e.g., an animation of no more than 5 seconds duration, a video clip of no more than 30 seconds duration, etc.). A rendering capabilities argument 714 can specify limitations of the mobile application or the mobile device as a filtering constraint (e.g., frame rate, color, depth, etc.). An urgency argument 716 can predict how many seconds in the future that the ad will be needed. A callback argument 718 can specify a function that should be called when the ad is ready.

In FIG. 8, an illustrative Write Log Event API key function can be used to write an ad view event to a usage tracking database. An Application ID argument 802 can identify the calling application. A name/value_pair_x argument 804 can be a secure field understood by the logging application (client ad syndication API) for user privacy and can contain additional information regarding the presentation.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations that fall within the spirit and scope of the appended claims.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description of the claims is meant to be a "non-exclusive or".

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions and/or instructions on a machine readable medium and/or computer readable medium, which may be incorporated into a computer program product. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for syndicated advertising content to a mobile device, comprising:
    executing an application on the mobile device containing an advertising opportunity;
    requesting advertising content from an advertisement syndication interface;
    determining a filtering constraint applicable to the advertising content request, including accessing an advertising campaign limitation for use as the filtering constraint;
    selecting an advertisement from advertisements stored in a local advertising cache by applying the filtering constraint to tags associated with the advertisements; and
    rendering the selected advertisement composited with rendering of content of the application.

2. The method of claim 1, further comprising defining an advertising space in a game application.

3. The method of claim 1, further comprising defining an advertising space in a markup document rendered in a mobile browser.

4. The method of claim 1, further comprising receiving advertising content multicast on an over-the-air broadcast channel.

5. The method of claim 4, further comprising storing a subset of received advertising content in accordance with predetermined criteria.

6. The method of claim 1, further comprising determining the filtering constraint from the advertising content request.

7. The method of claim 1, further comprising determining the filtering constraint from the advertising content request by selecting advertising content that can be played within a technical playback or rendering constraint provided in the request.

8. The method of claim 1, further comprising determining the filtering constraint from a user setting.

9. The method of claim 8, further comprising receiving a preferred category from the user.

10. The method of claim 8, further comprising receiving a blocked category from the user.

11. The method of claim 8, further comprising receiving a demographic category associated with the user.

12. The method of claim 8, further comprising referring to a user profile inferred from user inputs to a user interface of the mobile device.

13. The method of claim 1, further comprising determining the filtering constraint from a limitation associated with the selected advertising content.

14. The method of claim 1, further comprising accessing an advertising campaign limitation selected from a group comprising a start date, an end date, and a maximum number of impression per subscriber for use as the filtering constraint.

15. The method of claim 13, further comprising accessing a subscriber profile limitation for use as the filtering constraint.

16. The method of claim 15, further comprising accessing subscriber demographic data for use as the filtering constraint.

17. The method of claim 13, further comprising:
    accessing a royalty rate associated with the advertising content; and
    making a royalty optimizing selection among a plurality of advertising content that satisfies the filtering constraint.

18. The method of claim 1, further comprising logging usage of the application.

19. The method of claim 18, further comprising logging a time metric pertaining to a portion of the application interacted with by the user.

20. The method of claim 1, further comprising reporting usage to a remote network.

21. The method of claim 20, further comprising communicating via a circuit switch uplink channel.

22. The method of claim 20, further comprising communicating via a packet switch uplink channel.

23. At least one processor for utilizing syndicated advertising content on a mobile device, comprising:
    a first module for executing an application on the mobile device containing an advertising opportunity;
    a second module for requesting advertising content from an advertisement syndication interface;
    a third module for determining a filtering constraint applicable to the advertising content request including accessing an advertising campaign limitation for use as the filtering constraint;
    a fourth module for selecting an advertisement in accordance with the filtering constraint from a local advertising cache, wherein the advertisement is selected irrespective of user identified preferences; and
    a fifth module for rendering the selected advertisement composited with rendering of content of the application.

24. A computer program product for utilizing syndicated advertising content on a mobile device, comprising:
    a computer-readable storage medium, comprising:

a first set of instructions for causing a computer to execute an application on the mobile device containing an advertising opportunity;

a second set of instructions for causing the computer to request advertising content from an advertisement syndication interface;

a third set of instructions for causing the computer to determine a filtering constraint from the advertising content request, wherein the filtering constraint is generated by, and related to, the application on the mobile device;

a fourth set of instructions for causing the computer to select an advertisement in accordance with the filtering constraint from a local advertising cache; and a fifth set of instructions for causing the computer to render the selected advertisement composited with rendering of content of the application.

25. An apparatus for utilizing syndicated advertising content on a mobile device, comprising:

means for executing an application on the mobile device containing an advertising opportunity;

means for calling upon an advertisement syndication interface to request advertising content;

means for determining a filtering constraint applicable to the advertising content request, including means for accessing an advertising campaign limitation for use as the filtering constraint;

means for selecting an advertisement in accordance with the filtering constraint from a local advertising cache by applying the filtering constraint to an advertiser generated tag associated with the advertisement; and means for rendering the selected advertisement composited with rendering of content of the application.

26. An apparatus for utilizing syndicated advertising content on a mobile device, comprising:

a mobile computing platform;

local cache;

an application executing on the mobile computing platform of the mobile device that requests advertising content for an advertising opportunity within the application, wherein the request for the advertising content comprises a filtering constraint;

a client advertising interface executed on the mobile computing platform for responding to the request for the advertising content by determining the filtering constraint from the advertising content request, selecting an advertisement in accordance with the filtering constraint from the local cache, and accessing an advertising campaign limitation for use as the filtering constraint; and a user interface for rendering the selected advertisement composited with rendering of content of the application.

27. The apparatus of claim 26, wherein the application further comprises an advertising space defined in a game application.

28. The apparatus of claim 26, wherein the application further comprises an advertising space defined in a markup document rendered in a mobile browser.

29. The apparatus of claim 26, further comprising a communication module for receiving advertising content multicast on an over-the-air broadcast channel.

30. The apparatus of claim 29, further comprising the client advertising interface for storing a subset of received advertising content in accordance with predetermined criteria.

31. The apparatus of claim 26, further comprising the client advertising interface for determining the filtering constraint from the advertising content request.

32. The apparatus of claim 26, further comprising the client advertising interface for determining the filtering constraint from the advertising content request by selecting advertising content that can be played within a technical playback or rendering constraint provided in the request.

33. The apparatus of claim 26, further comprising the client advertising interface for determining the filtering constraint from a user setting.

34. The apparatus of claim 33, further comprising the client advertising interface for receiving a preferred category from the user.

35. The apparatus of claim 33, further comprising the client advertising interface for receiving a blocked category from the user.

36. The apparatus of claim 33, further comprising the client advertising interface for receiving a demographic category associated with the user.

37. The apparatus of claim 33, further comprising the client advertising interface for referring to a user profile inferred from user inputs to the user interface of the mobile device.

38. The apparatus of claim 26, further comprising the client advertising interface for determining the filtering constraint from a limitation associated with the selected advertising content.

39. The apparatus of claim 26, further comprising the client advertising interface for accessing an advertising campaign limitation selected from a group comprising a start date, an end date, and a maximum number of impression per subscriber.

40. The apparatus of claim 38, further comprising the client advertising interface for accessing a subscriber profile limitation.

41. The apparatus of claim 40, further comprising the client advertising interface for accessing subscriber demographic data.

42. The apparatus of claim 38, further comprising the client advertising interface for accessing a royalty rate associated with the advertising content, and making a royalty optimizing selection among a plurality of advertising content that satisfies the filtering constraint.

43. The apparatus of claim 26, further comprising the client advertising interface for logging usage of the application.

44. The apparatus of claim 43, further comprising the client advertising interface for logging a time metric pertaining to a portion of the application interacted with by a user.

45. The apparatus of claim 26, further comprising a communication module for reporting usage to a remote network.

46. The apparatus of claim 45, further comprising the communication module for communicating via a circuit switch uplink channel.

47. The apparatus of claim 45, further comprising the communication module for communicating via a packet switch uplink channel.

48. A method for wireless syndication of advertising content to mobile device, comprising:

tagging advertising content with a filtering constraint;

wirelessly multicasting the advertising content tagged with the filtering constraint to a client advertising interface executed respectively on a plurality of mobile devices for being locally cached and selectively played in conformance to the tagged filtering constraint in conjunction with an advertising opportunity defined in a mobile application; and receiving a usage report from the plurality of mobile devices pertaining to advertising usage with the mobile application.

49. The method of claim 48, further comprising defining an advertising space in a game application compatible with the advertising content tagged with the filtering constraint.

50. The method of claim 48, further comprising defining an advertising space in a markup document rendered in a mobile browser compatible with the advertising content tagged with the filtering constraint.

51. The method of claim 48, further comprising transmitting advertising content multicast on an over-the-air broadcast channel.

52. The method of claim 51, further comprising causing storage of a subset of received advertising content in accordance with predetermined criteria on a subset of the plurality of mobile devices.

53. The method of claim 48, further comprising tagging the advertising content with a characteristic sufficient for comparison with the filtering constraint from a mobile application advertising content request.

54. The method of claim 48, further comprising tagging the advertising content within a technical playback or rendering constraint.

55. The method of claim 48, further comprising receiving a user setting from a web portal and sending to the mobile device for use as the filtering constraint.

56. The method of claim 55, further comprising receiving a preferred category from a user from the web portal and sending to the mobile device for use as the filtering constraint.

57. The method of claim 55, further comprising receiving a blocked category from a user from the web portal and sending to the mobile device for use as the filtering constraint.

58. The method of claim 55, further comprising receiving a demographic category from a user from the web portal and sending to the mobile device for use as the filtering constraint.

59. The method of claim 55, further comprising inferring a user profile from interactions with a network via the mobile device and sending the user profile to the mobile device as the filtering constraint.

60. The method of claim 48, further comprising tagging the advertising content with a playback or rendering limitation.

61. The method of claim 48, further comprising tagging the advertising content with an advertising campaign limitation.

62. The method of claim 61, further comprising tagging the advertising content with an advertising campaign limitation selected from a group comprising a start date, an end date, and a maximum number of impression per subscriber.

63. The method of claim 48, further comprising tagging the advertising content with a subscriber profile limitation.

64. The method of claim 48, further comprising tagging the advertising content with a royalty rate associated with the advertising content for making a royalty optimizing selection among a plurality of advertising content that satisfies the filtering constraint.

65. The method of claim 48, further comprising receiving usage logs of the mobile application from the mobile device pertaining to application usage.

66. The method of claim 48, further comprising receiving a usage log from the mobile device containing a time metric pertaining to a portion of the mobile application interacted with by a user.

67. The method of claim 48, further comprising communicating via a circuit switch uplink channel with the mobile device to receive the usage report.

68. The method of claim 48, further comprising communicating via a packet switch uplink channel.

69. At least one processor for wireless syndication of advertising content to mobile device, comprising:

a first module for tagging advertising content with a filtering constraint, wherein the filtering constraint indicates a subset of a plurality of mobile devices that the advertising content should be transmitted to;

a second module for wirelessly multicasting the advertising content tagged with the filtering constraint to a client advertising interface executed respectively on the subset of the plurality of mobile devices indicated by the filtering constraint for being locally cached and selectively played in conformance to the tagged filtering constraint in conjunction with an advertising opportunity defined in a mobile application; and a third module for receiving a usage report from the plurality of mobile devices pertaining to advertising usage with the mobile application.

70. A computer program product for wireless syndication of advertising content to mobile device, comprising:

a computer-readable storage medium comprising, a first set of instructions for causing a computer to tag the advertising content with a filtering constraint, the filtering constraint comprising a plurality of tags that are used to filter the advertising content;

a second set of instructions for causing the computer to wirelessly multicast the advertising content tagged with the filtering constraint to a client advertising interface executed respectively on a plurality of mobile devices for being locally cached and selectively played in conformance to the tagged filtering constraint in conjunction with an advertising opportunity defined in a mobile application; and a third set of instructions for causing the computer to receive a usage report from the plurality of mobile devices pertaining to advertising usage with the mobile application.

71. An apparatus for wireless syndication of advertising content to mobile device, comprising:

means for tagging advertising content with a filtering constraint;

means for wirelessly multicasting the advertising content tagged with the filtering constraint to a client advertising interface executed respectively on a plurality of mobile devices for being locally cached and selectively played in conformance to the tagged filtering constraint in conjunction with an advertising opportunity defined in a mobile application; and means for receiving a usage report from the plurality of mobile devices pertaining to advertising usage with the mobile application.

72. An apparatus for wireless syndication of advertising content to mobile device, comprising:

an advertising service component for tagging advertising content with a filtering constraint;

a multicast broadcast transmitter for wirelessly multicasting the advertising content tagged with the filtering constraint to a client advertising interface executed respectively on a plurality of mobile devices for being locally cached and selectively played in conformance to the tagged filtering constraint in conjunction with an advertising opportunity defined in a mobile application; and a network receiver for receiving a usage report from the plurality of mobile devices pertaining to usage with the mobile application.

73. The apparatus of claim 72, further comprising defining an advertising space in a game application compatible with the advertising content tagged with the filtering constraint.

74. The apparatus of claim 72, further comprising defining an advertising space in a markup document rendered in a mobile browser compatible with the advertising content tagged with the filtering constraint.

75. The apparatus of claim 72, further comprising transmitting advertising content multicast on an over-the-air broadcast channel.

76. The apparatus of claim 75, further comprising causing storage of a subset of received advertising content in accordance with predetermined criteria on a subset of the plurality of mobile devices.

77. The apparatus of claim 72, further comprising tagging the advertising content with a characteristic sufficient for comparison with the filtering constraint from a mobile application advertising content request.

78. The apparatus of claim 72, further comprising tagging the advertising content within a technical playback or rendering constraint.

79. The apparatus of claim 72, further comprising receiving a user setting from and sending to the mobile device for use as the filtering constraint.

80. The apparatus of claim 79, further comprising receiving a preferred category from a user and sending to the mobile device for use as the filtering constraint.

81. The apparatus of claim 79, further comprising receiving a blocked category from a user and sending to the mobile device for use as the filtering constraint.

82. The apparatus of claim 79, further comprising receiving a demographic category from a user and sending to the mobile device for use as the filtering constraint.

83. The apparatus of claim 79, further comprising inferring a user profile from interactions with a network via the mobile device and sending the user profile to the mobile device as the filtering constraint.

84. The apparatus of claim 72, further comprising tagging the advertising content with a playback or rendering limitation.

85. The apparatus of claim 72, further comprising tagging the advertising content with an advertising campaign limitation.

86. The apparatus of claim 85, further comprising tagging the advertising content with an advertising campaign limitation selected from a group comprising a start date, an end date, and a maximum number of impression per subscriber.

87. The apparatus of claim 72, further comprising tagging the advertising content with a subscriber profile limitation.

88. The apparatus of claim 72, further comprising tagging the advertising content with a royalty rate associated with the advertising content for making a royalty optimizing selection among a plurality of advertising content that satisfies the filtering constraint.

89. The apparatus of claim 72, further comprising receiving usage logs of the mobile application from the mobile device.

90. The apparatus of claim 72, further comprising receiving a usage log from the mobile device containing a time metric pertaining to a portion of the mobile application interacted with by a user.

91. The apparatus of claim 72, further comprising communicating via a circuit switch uplink channel with the mobile device to receive the usage report.

92. The apparatus of claim 72, further comprising communicating via a packet switch uplink channel.

* * * * *